(12) United States Patent
Efimov

(10) Patent No.: US 8,257,885 B1
(45) Date of Patent: Sep. 4, 2012

(54) RECORDING REFLECTION BRAGG GRATINGS AND APODIZING REFLECTION BRAGG GRATINGS

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1630 days.

(21) Appl. No.: 11/636,217

(22) Filed: Dec. 7, 2006

(51) Int. Cl.
*G03H 1/02* (2006.01)
(52) U.S. Cl. .................... 430/1; 430/2; 359/3; 359/35
(58) Field of Classification Search .................. None
See application file for complete search history.

(56) References Cited

U.S. PATENT DOCUMENTS

| | | | | |
|---|---|---|---|---|
| 3,530,442 | A * | 9/1970 | Lin et al. ................ | 365/125 |
| 3,536,405 | A * | 10/1970 | Flower .................... | 356/631 |
| 3,776,995 | A * | 12/1973 | Iittle ...................... | 264/219 |
| 4,687,720 | A * | 8/1987 | Wreede et al. ............ | 430/2 |
| 4,815,800 | A * | 3/1989 | Chern et al. .............. | 359/3 |
| 4,818,045 | A * | 4/1989 | Chang .................... | 359/15 |
| 5,071,208 | A * | 12/1991 | Chang .................... | 359/10 |
| 5,208,123 | A * | 5/1993 | Ramsbottom .............. | 430/1 |
| 5,491,570 | A * | 2/1996 | Rakuljic et al. ........... | 359/7 |
| 5,640,257 | A * | 6/1997 | Clube ..................... | 359/30 |
| 6,322,933 | B1 * | 11/2001 | Daiber et al. .............. | 430/2 |
| 6,624,915 | B1 * | 9/2003 | Kirkpatrick et al. ........ | 359/3 |
| 7,864,388 | B2 * | 1/2011 | Effimov .................. | 359/22 |
| 2002/0114553 | A1 * | 8/2002 | Mead et al. ............... | 385/10 |
| 2004/0223385 | A1 * | 11/2004 | Fleming et al. ............ | 365/202 |
| 2006/0227398 | A1 * | 10/2006 | Lawrence et al. ........... | 359/15 |

OTHER PUBLICATIONS

Baker et al. "Sampled Bragg gratings in chalcogenide (As2S3) rib waveguides", Opt. Expr. vol. 14(20) pp. 9451-9459 (Oct. 2006).*
Hsu et al., "Fiber Bragg Grating sequential UV writing method with real time interferometric side diffraction position monitoring", Opt. Exp., vol. 13(10) pp. 3795-3801 (May 2005).*
Andreas Othonos, et al., *Fiber Bragg Gratings: Fundamentals and Applications in Telecommunications and Sensing*, 1999, pp. 103-105, Artech House, Inc., Norwood, Massachusetts.
J. Albert, et al., "Moire phase masks for automatic pure apodisation of fibre Bragg gratings," *Electronic Letters*, Nov. 21, 1996, pp. 2260-2261, vol. 32, No. 24, IEE.
J. M. Tsui, et al., "Coupled-wave analysis of apodized volume gratings," *Optic Express*, Dec. 27, 2004, pp. 6642-6653, vol. 12, No. 26, Optical Society of America.
R. Kashyap, et al., "Simple technique for apodising chirped and unchirped fibre Bragg gratings," *Electronics Letters*, Jun. 20, 1996, pp. 1226-1228, vol. 32, No. 13, IEE.

* cited by examiner

Primary Examiner — Martin Angebranndt
(74) *Attorney, Agent, or Firm* — Christie, Parker, Hale

(57) ABSTRACT

A system and method for producing a Bragg grating. A system and a method for apodization of gratings. The system and method for producing a grating include splitting a beam and reflecting one split beam an odd number of times and the other an even number of times before the two are allowed to interfere within a photosensitive target. When the original beam is scanned in predetermined directions, the split beams scan the target while interfering within the target. The original beam is scanned such that an intersection point of the reflected split beams moves along a bisector of the two split beams. In the system and method for apodizing, scanning of the interfering beams along a length of the target may be controlled to yield a substantially uniform average refractive index for the apodized grating that is being recorded in the photosensitive target medium.

6 Claims, 9 Drawing Sheets

RECORDING REFLECTION BRAGG GRATINGS AND APODIZING REFLECTION BRAGG GRATINGS

BACKGROUND OF THE INVENTION

1. Field of the Invention

This invention relates to reflection Bragg Gratings and more particularly to a system and a method for recording large-sized reflection Bragg Gratings and a system and a method for apodization of large-sized reflection Bragg Gratings.

2. Description of Related Art

Reflection Bragg Gratings are volume gratings that are written by recording volume holograms created by the interference between two optical beams. Writing the volume holograms may be performed through transmission geometry or reflection geometry setups.

FIG. 1 is a schematic plan view of a conventional reflection Bragg Grating recording system in transmission geometry. When recording the reflection Bragg Grating in transmission geometry, the two optical beams 1, 2 are incident upon the same face of a recording medium 3 and transmitted through the recording medium 3. The recording medium 3 may also be referred to as a target or a sample and it may be made from a material such as lithium niobate or photothermorefractive glass.

FIG. 2 shows a schematic plan view of a conventional reflection Bragg Grating recording system in reflection geometry. When recording the reflection Bragg Grating in reflection geometry, two optical beams 10, 20 are incident on opposite faces of a recording medium 30 and transmitted through the recording medium 30. The interference pattern caused by the two beams 10, 20 intersecting at the center of the recording medium 30 is recorded. Each beam enters the recording medium at the same angle of incidence, interferes with the other beam, and continues through the medium to exit from the opposite face. The interference patterns are used to record the volume holograms within the medium.

There are a number of problems associated with recording large-sized reflection Bragg gratings. For example, even highly expanded Gaussian beams, usually used for recording well-characterized gratings, cannot provide high-homogeneous distribution of exposure dosage across a large area. This results in non-uniform diffraction efficiency (DE) distribution across recorded gratings. Small-scale distortions in the spatial distribution of the interfering beams are imprinted in the gratings during recording and result in hologram degradations. In the case when the Bragg Gratings are written in transmission geometry and are read in reflection geometry, large-size grating recording is available only for rather low absorbing materials. High absorption material, such as photothermorefractive glass, prevent the deep penetration of laser beams into the material and make recording of large-sized holograms difficult.

Referring to FIGS. 1 and 2, the incident optical beams have a large size to allow recording over a large area of incidence. Usually, the beams used for hologram recording have a Gaussian spatial profile and a wide distribution in intensity. Therefore, the recorded interference patterns have an uneven modulation, causing the exposure dosage across a large area of the medium to have a nonhomogenous distribution. The diffraction efficiency across recorded gratings, therefore, may have a nonuniform distribution.

To provide approximately the same exposure dosage over a recording medium, only the central portions of the Gaussian beams are typically used for recording. This necessitates obtaining a large interference area. To obtain a large interference area, expanded Gaussian beams are created by expanding the output of well-characterized, single-transverse-mode lasers with diameters from 1-2 mm to several tens of cms.

Use of such expanded beams, however, presents additional problems. One problem is that expansion of the beams requires large, expensive optics. Additionally, even using the highly expanded Gaussian beams, there is still a considerable difference in the exposure dosage of different parts of the holograms. A large expansion is also difficult to implement without truncating the edges of the expanded beams. The beam truncation causes diffraction, which manifests itself as additional patterns in the hologram. These parasitic patterns modulate the dominant grating of the hologram and reduce the overall performance of the final product. Further, truncating the edges of the expanded beams decreases the power density of the interfering beams, which necessitates undesirably lengthy exposures. Another problem with typical systems used to record large-sized reflection Bragg Gratings is that distortions in the spatial distribution of the interfering beams result in hologram degradations. These distortions may be caused by imperfections of optics, diffraction due to dust particles or inhomogeneities of optics, and interference between the main beam and the beams re-reflected from the different surfaces of the optical set up and recording media.

Typical systems for recording Bragg Gratings include wavefront-splitting interferometers, phase-masks, or amplitude-splitting interferometers. The wavefront-splitting interferometer systems carve out two interfering beams from different areas of the wavefront of a spatially coherent beam. Such splitting, however, results in diffraction at the boundary of the cut, causing the parasitic interference fringes described above. Further, additional beam expansion is necessary if large-sized gratings are to be recorded. In phase-mask systems, a phase mask is illuminated by a single laser beam, creating interfering beams on a closely positioned target. Large-sized or thick gratings can therefore not be recorded using these systems. In amplitude-splitting interferometer systems, two interfering beams are created by splitting a parent beam in two, and combining the two beams on a target in transmission or reflection geometry.

The basic maximum in the spectral or angular distribution of diffraction efficiency in finite length Bragg Gratings with uniform modulation of the refractive index is typically accompanied by a number of sidelobes at adjacent wavelengths or angles. Refractive index or index of refraction of a material is the factor by which the phase velocity of electromagnetic radiation is slowed in that material, relative to its velocity in a vacuum. Apodization, i.e., elimination of these sidelobe reflections, is desirable or even necessary in some applications. For example, in dense wavelength division multiplexing (DWDM), the apodization of Bragg Gratings is necessary to exclude crosstalk between information channels. Another example is the use of Bragg Gratings as spectral or angular selectors in laser techniques when only the main diffraction maximum is needed for a proper spectral or angular shape of laser radiation.

The conventional methods of reflection Bragg Grating apodization are applicable only to fiber gratings or to small-sized gratings (i.e., gratings small in the direction perpendicular to the direction of beam propagation). In these cases, the apodization is produced from exposure along the lateral sides of the Bragg Gratings.

In another method, the produced Bragg grating is irradiated with a highly absorbed radiation from both sides. The beams are absorbed in a photosensitive medium such that the sides of the material are provided with a large exposure dosage, which rapidly decreases before reaching the center. This results in the more efficient partial "erasing" of recorded grating close to the surfaces. These apodization methods thus result in a nonuniform average dosage of irradiation and in a nonuniform average refractive index through the thickness of the material, which causes a shift in the frequency of light reflected from the surface regions of Bragg Grating relative to the central part when it is read.

SUMMARY

Embodiments of the present invention disclose a system and a method for directing light beams onto a photosensitive medium to record a Bragg grating. Embodiments of the present invention also disclose a system and a method for apodizing a grating during recording of the grating.

Embodiments of the present invention provide a system for recording a Bragg grating by directing light beams onto a target. The system includes a beam emitter, a beam splitter, and a plurality of reflective elements. The beam emitter is used for emitting a beam of light. The beam splitter receives and splits the beam of light into a first split beam to travel along a first beam path and a second split beam to travel along a second beam path. The reflective elements are located in the first beam path for reflecting the first split beam and in the second beam path for reflecting the second split beam. The beams are reflected by the reflective elements such that a reflected first split beam intersects a reflected second split beam at an intersection point in the target. The beam of light is scanned such that the intersection point is moved in the target.

The reflective elements and the beam splitter may be disposed in the first beam path and the second beam path such that when the beam of light is scanned, the reflected first split beam path moves in a first direction and the reflected second split beam path moves in a second direction opposite to the first direction. In other words, the beam of light is scanned such that the reflected first split beam moves in a first direction with respect to a travel direction of the reflected first split beam and the reflected second split beam moves in a second direction with respect to a travel direction of the reflected second split beam. The first direction is opposite the second direction. In this embodiment, the first direction, the second direction, the reflected first split beam and the reflected second split beam fall in one plane. For example, the beam of light is scanned such that the reflected first split beam is moved to a right of the reflected first split beam and the reflected second split beam is moved in the second direction to a left of the reflected second split beam. In one embodiment, the intersection point is moved along a bisector of an angle formed between the reflected first and second split beams.

Embodiments of the present invention also provide a method of recording a Bragg Grating in a target. The method includes emitting a beam of light, splitting the beam of light into a first beam and a second beam, reflecting the first beam an odd number of times before transmitting the first beam to a target and reflecting the second beam an even number of times before transmitting the first beam to the target. The second beam interferes with the first beam in an interference region inside the target. The method further includes scanning the beam of light for scanning the first beam and the second beam relative to the target such that the interference region is scanned along a first scan line in the target, the first scan line traversing along a first dimension of the target and recording an interference pattern of the interference region in the target along the first scan line. The scanning the beam of light moves the first beam in a first direction with respect to a travel direction of the first beam and moves the second beam in a second direction with respect to a travel direction of the second beam. The first direction is opposite the second direction. For example, the scanning the beam of light moves the first beam to a right of the first beam and moves the second beam to a left of the second beam and the right and the left are viewed from the perspective of each beam. In one embodiment, the first scan line bisects an angle between the first beam and the second beam, and the scanning of the beam of light conserves an angle formed between the first beam and the second beam as the intersection point is moved along the target.

Embodiments of the present invention also provide a method for apodizing a recorded grating in a target. The target has a first side and a second side opposite the first side and substantially parallel to the first side. The method includes directing a first beam along a first path through the first side of the target, directing a second beam along a second path through the second side of the target, and scanning the interference region in the target along a scan line. A thickness of the target along a first direction substantially perpendicular to the first side and the second side is comparable to a width of the first beam along the first direction and a width of the second beam along the first direction. Directing the first beam along the first path through the first side of the target influences a first change in a refractive index of the target along the first path. Directing the second beam along the second path through the second side of the target influences a second change in the refractive index of the target along the second path. The second beam interferes with the first beam in an interference region in the target. The scan line bisects an angle between the first path and the second path.

DETAILED DESCRIPTION

The embodiments of the present invention provide a system and a method for recording large-sized high-homogeneous reflection holographic gratings. One embodiment utilizes two-dimensional scanning of a recording media (a target) with an interfering pattern from two optical beams which may be relatively small in comparison with a total grating area.

A two-beam interferometer system is provided that may be used in combination with a special matching liquid cell to provide a method for recording large-sized high-homogeneous reflection Bragg Gratings, even if high-absorption photosensitive materials are used as the target. Additionally, the embodiments of the present invention provide a system having the capability of diffraction efficiency profiling across the gratings using beams that may not be homogeneous or bell-shaped. The embodiments permit recording well-characterized gratings even if the recording beam wavefronts are not perfectly planar and/or if they have small local distortions.

Figure 1:
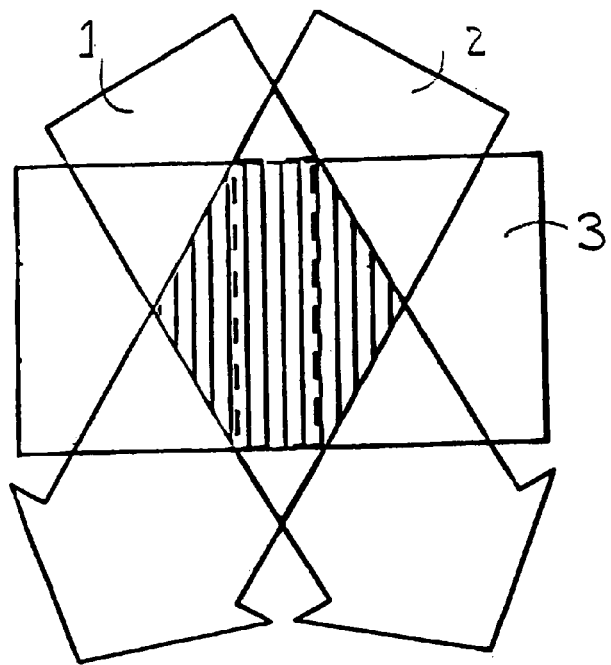
FIG. 1 is a schematic plan view of a conventional reflection Bragg Grating recording system in transmission geometry.
Figure 2:
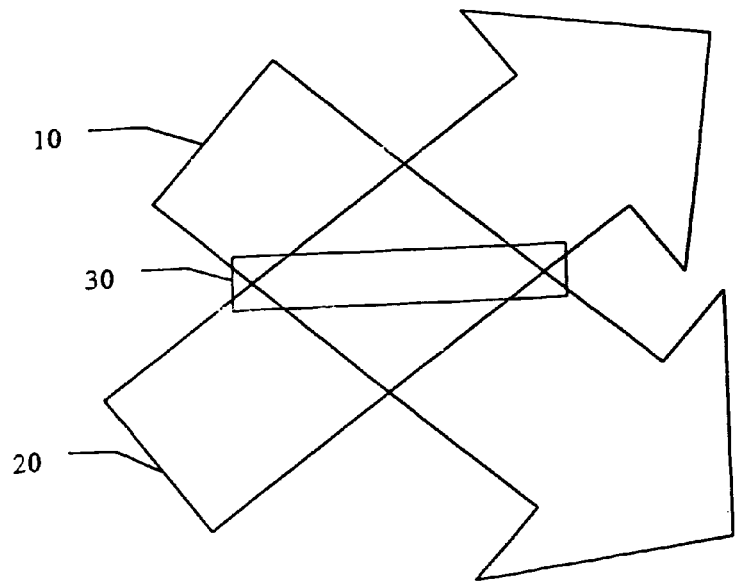
FIG. 2 is a schematic plan view of a conventional reflection Bragg Grating recording system in reflection geometry.
Figure 3:
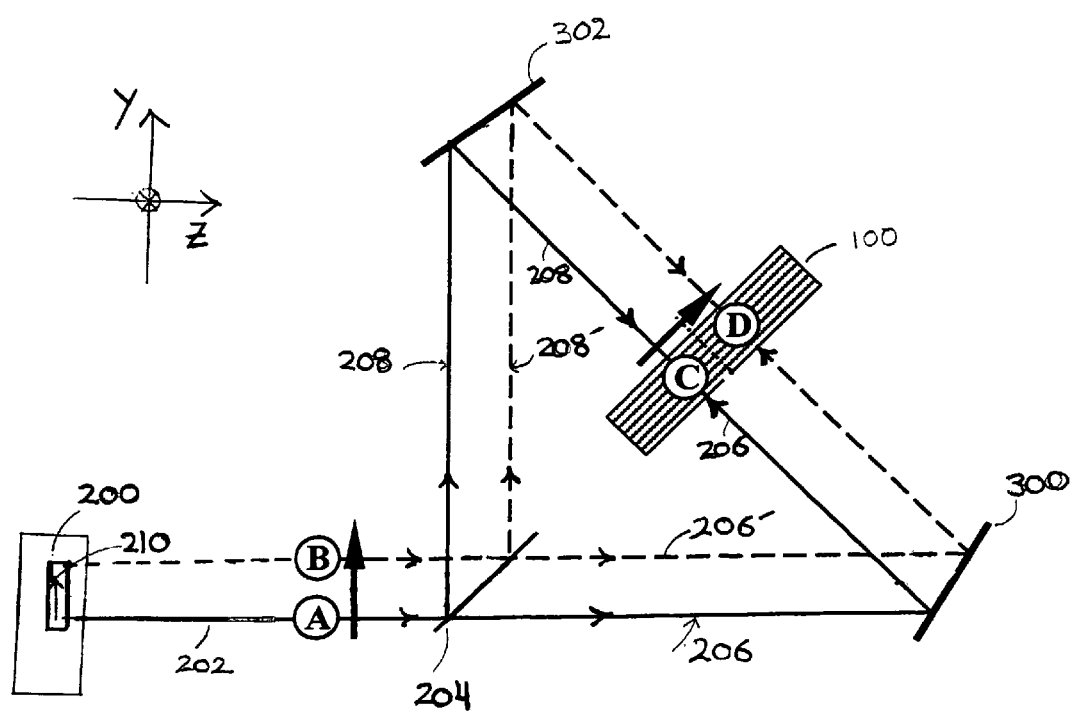
FIG. 3 is a schematic plan view of one embodiment of a Bragg Grating recording system in reflection geometry according to the invention.

FIG. 3 shows a Bragg Grating recording system according to the embodiments of the invention. The system shown, includes a beam emitter 200 for emitting a beam of light 202 that is directed onto a target 100 and uses reflection geometry, as opposed to transmission geometry. The target 100 may be a photosensitive transmission medium. The system also includes a beam splitter 204 for receiving and splitting the beam of light 202 into a first split beam 206 to travel along a first beam path and a second split beam 208 to travel along a second beam path. The system further includes reflective elements 300, 302 located in the first beam path and the second beam path. The reflective elements 300, 302 reflect respectively the first and second split beam paths 206, 208 such that the first split beam 206 intersects with the second split beam 208 at an intersection point C in the target 100.

Because the beams of light are not one dimensional lines, they intersect in regions that are areas as opposed to being zero dimensional points. Therefore, the term intersection point refers to an intersection region that may be a small or a large area.

A scanner 210 scans the beam of light 202 along the Y axis direction from a position A to a position B. The first and second beam paths 206, 208 then move from the solid line paths to the dotted line paths 206', 208', as indicated in FIG. 3. From its perspective, the first split beam 206 moves to the right along the target 100. Conversely, from its perspective, the second split beam 208 moves to the left, or in the opposite direction, along the photosensitive medium 100. This causes the two split beams 206, 208 to continue to intersect in the photosensitive medium 100 as the beam of light 202 is scanned and moves from position A to position B. The intersection point of the first beam path and the second beam path is moved along an intersection line from C to D in the photosensitive medium 100. The intersection line from C to D may bisect the angle between the split beams 206, 208. In this embodiment, the intersection line is perpendicular to the directions of the split beams after they have been reflected from the reflective elements 300, 302.

In the embodiment shown in FIG. 3, the reflected split beams move in opposite directions when the beam of light is scanned because one of the beams is reflected once and the other one is reflected twice. The reflected split beam 206 moves to the right of where it was before the beam 202 was scanned to B. The reflected split beam 208 moves to the left of where it was before the beam 202 was scanned to B. Right and left are viewed from the perspective of the beam itself and are relative to the direction of travel of the beam. The first split beam is reflected only once, by the reflecting element 300. The second split beam, however, is reflected first by the beam splitter 204 and then by the reflecting element 302. This relationship of moving in opposite directions, will be true if one of the split beams is reflected an odd number of times and the other of the split beams is reflected an even number of times.

The reflecting elements 300, 302 may be mirrors or any other elements capable of reflecting received light along the first or second split beam paths. In this embodiment, the reflecting elements are slightly larger than the area of the photosensitive medium 100 to be scanned. The scanner 210 may be included in the beam emitter, or it may be a movable beam emitter, a movable aperture, or any other means of emitting the beam of light from various locations. For example, a movable aperture may be located between the beam emitter and the beam splitter for scanning the beam of light by selectively allowing transmission of the beam of light at different positions.

Figure 4:
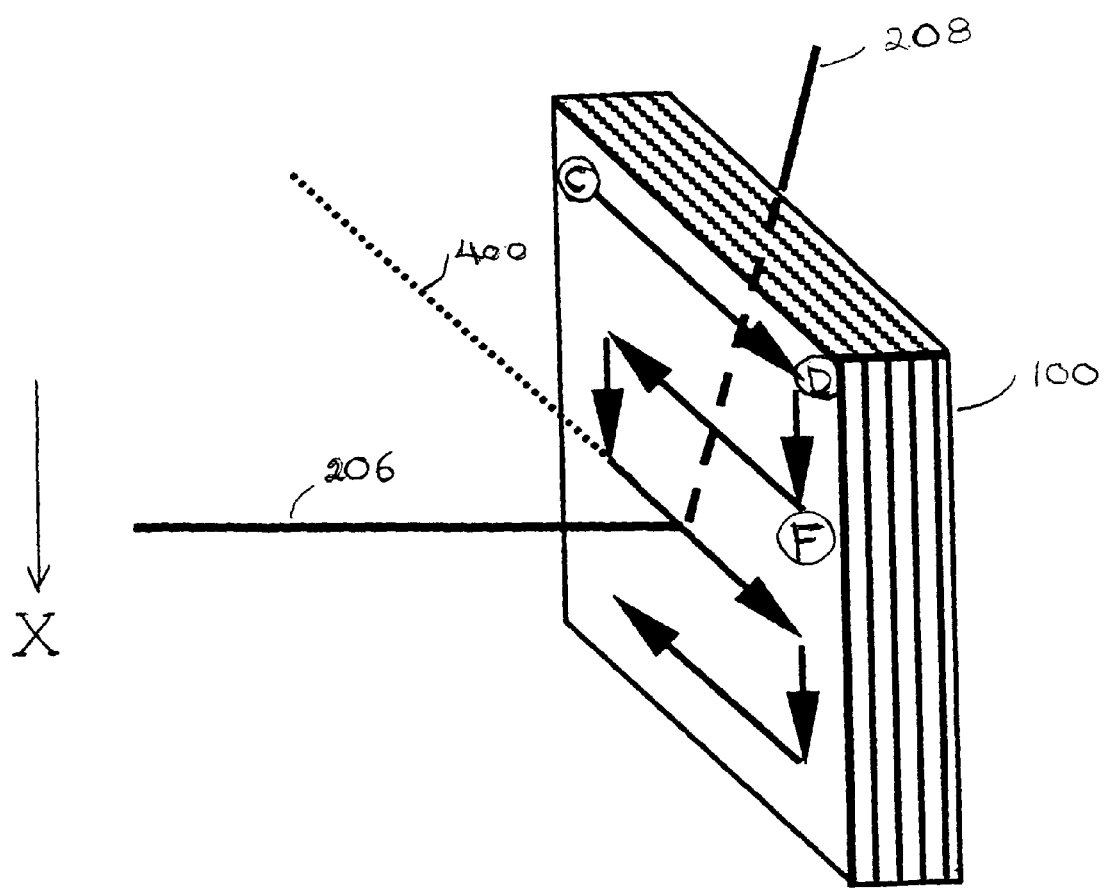
FIG. 4 is a side perspective view showing a method of scanning a photosensitive medium.

FIG. 4 shows a perspective view of the photosensitive medium 100 when being used for recording Bragg Gratings in the reflection geometry of FIG. 3. In FIG. 3, after the scanner 210 scans the beam of light 202 from position A to position B along the Y axis, the scanner 210 again scans the beam of light 202 along an X axis direction to a position directly underneath position B in the view shown. The X axis is going into the paper in FIG. 3. Therefore, the subsequent position of the beam would appear as superimposed on position B and is not shown in FIG. 3 because it would be directly under the position B. The intersection point between the two beams 206, 208 is then also moved along the x-axis direction to a lower position F on the photosensitive medium 100, that is shown in FIG. 4. This process of moving the location of the beam alternately along the two different axes, is then repeated until all or substantially all of the photosensitive medium is scanned. Scanning the beam 202 along the Y axis results in scanning of the target 100 along a line parallel to the CD line in FIG. 4 and scanning the beam 202 along the X axis results in scanning of the target 100 along a line parallel to the DF line in FIG. 4.

As shown in FIG. 4, by scanning the interference pattern along the entire grating in a direction of a bisector 400 between the first and second split beams 206, 208, each of the beams can be relatively small in comparison with a total grating area of the photosensitive medium.

Figure 5:
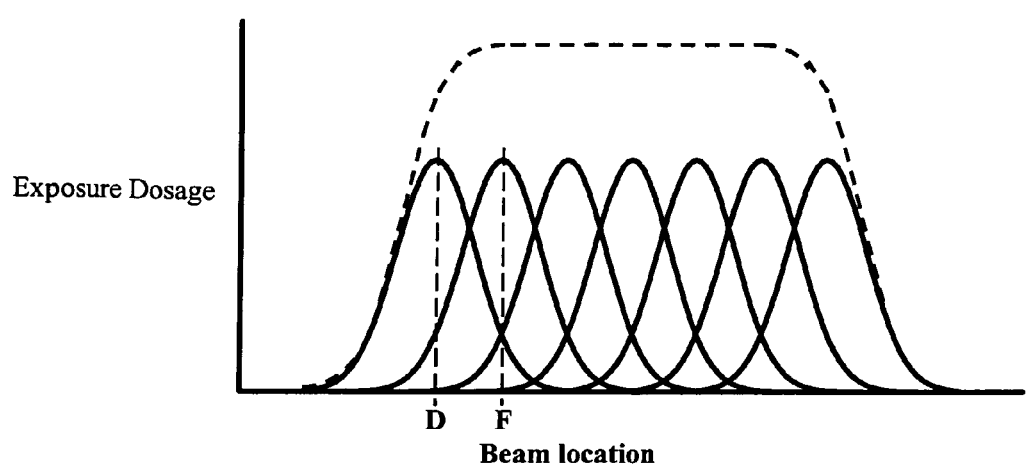
FIG. 5 is a plot of exposure dosage distribution versus location along the photosensitive medium of FIG. 4 as scanned with split beams having a Gaussian distribution.

FIG. 5 shows the exposure dosage of the photosensitive medium 100 as the split beams with Gaussian profiles are multiple scanned over the grating along lines parallel to the line CD of FIG. 4. The horizontal axis of FIG. 5 is parallel to the X axis of FIG. 4 and shows the beam location along the X axis as the beam scans lines parallel to the CD of FIG. 4. The vertical axis of FIG. 5 shows the exposure dosage of the photosensitive medium 100 along the DF direction. Every scan along the lines parallel to CD results in the irradiated strip having an exposure dosage of Gaussian distribution (solid lines in FIG. 5) along the direction parallel to CD. As shown in FIG. 5, as a result of multiple scanning of the split beams 206, 208 the nonuniform Gaussian interference patterns of the parallel dosages overlap with one another. Overlap of the multiple Gaussian distributions results in a substantially uniform distribution (dashed line in FIG. 5) of exposure dosage over the area of grating recorded in the photosensitive medium 100 and increases the uniformity of the diffraction efficiency of the grating. Further, two-dimensional scanning of both interfering beams improves the quality of hologram recording, especially in the case of large-sized grating recording because imperfections of the beams are integrated during the scanning.

Most techniques for recording of gratings are based on an interference of two well-characterized, stationary positioned optical beams. Any displacement of the optical elements even on a fraction of wavelength results in the additional phase shift of the beams and in the spatial shift of the interference pattern. Therefore, any vibrations of optical elements and the photosensitive medium, or air turbulence, is typically excluded in the holographic systems. By scanning the beam of light along the beam splitter, the reflective elements, and the photosensitive medium, none of the stationary elements of the system need to be moved. Further, two-dimensional scanning of both interfering beams reduces the quality of hologram recording, especially in the case of large-sized grating recording. The fact that the movement of the split beams is directly produced from movement of the same original beam of light also allows for highly synchronized movement. This allows using a small-sized scanning beam for a large-sized reflection grating recording that results in higher homogeneity of gratings.

Reflecting one of the split beams an odd number of times and the other split beam an even number of times allows the two split beams to scan in opposite directions when the beam of light is scanned. The opposite directions are viewed from the perspective of the travel direction of the split beam. This allows for the split beams to continue intersecting when entering the photosensitive medium from opposite sides while the beam of light is scanned. Thus, this embodiment allows synchronous motion of the split beams across the surface of the photosensitive medium, conserves the phase relations between the split beams during scanning, and provides an opportunity for large sized reflection Bragg Grating recording without the drawbacks of prior art methods discussed above.

Figure 6:
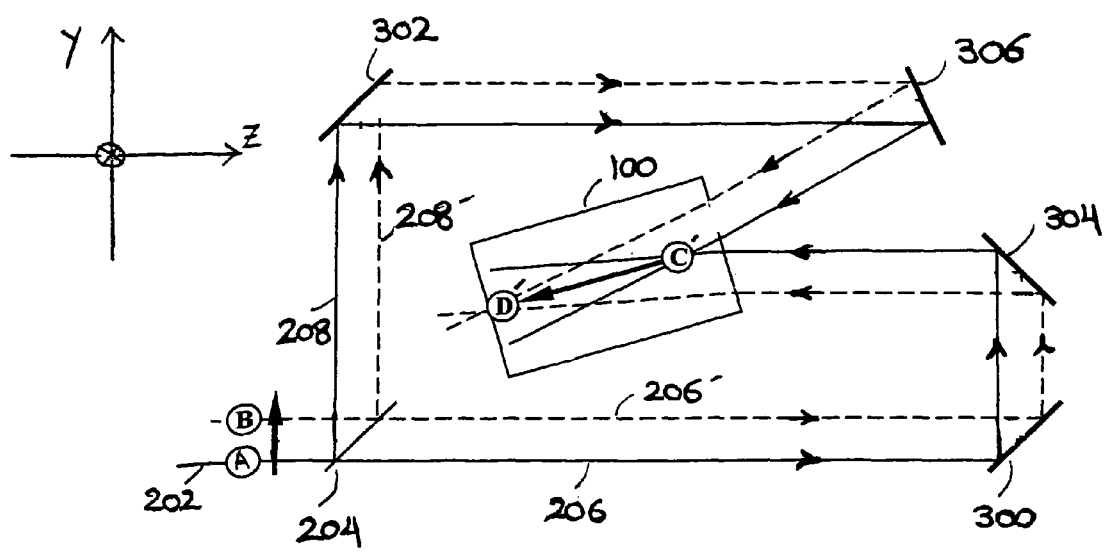
FIG. 6 is a schematic plan view of one embodiment of a Bragg Grating recording system in transmission geometry according to the invention.

In another embodiment, a large-sized reflection Bragg Grating can be recorded in transmission geometry. FIG. 6 shows a schematic diagram of an interferometer for hologram recording in transmission geometry. In this embodiment, two additional reflective elements 304, 306 are also used. The first split beam 206 experiences an even number of reflections from reflective element 300 and reflective element 304 before combining with the second split beam 208 on the photosensitive medium 100. The second split beam 208 experiences an odd number of reflections from the beam splitter 204, reflective element 302, and the reflective element 306 before combining with the first split beam 206 on the photosensitive medium 100. Therefore, as the beam of light 202 is scanned from position A to position B, or from the solid line path 206 to the dotted line path 206', on the photosensitive medium 100, the first split beam 206 moves to its left and the second split beam 208 moves to its right and away from the first split beam. As a result, the intersection point of the split beams 206, 208 moves from position C' to a position D' within the photosensitive medium. The position D' is farther from the point of incidence of the split beams 206, 208 on the photosensitive medium 100 than position C' and therefore deeper in the photosensitive medium. The path of C'D' bisects an angle formed between the reflected first and second split beams along their final path to the target. As discussed in relation to FIG. 3, the beam of light 202 is then moved along the X axis and into the paper to a position which is not shown because it falls directly under the position B in the plan view shown in FIG. 6.

The synchronous scanning of the interference pattern along the photosensitive medium increases the uniformity of exposure dosage across the target area. A computer controlled variation of scanning velocity and/or total beam power may also be used for two-dimensional profiling of exposure dosage and diffraction efficiency of the recorded grating.

A large beam expansion required for large-sized grating recording is typically difficult to implement without truncating its edges, resulting in imprinting parasitic diffraction patterns into the gratings. In the embodiments described above, however, the size of the recording beam is considerably smaller than the size of the hologram. Therefore, scanning can be completed so as to exclude any truncating of the beam edges by, for example, including reflecting elements of interferometer that are slightly larger than the scanning area. All other optical elements needed for beam formation, recording, and scanning may still have relatively small sizes.

The embodiments described above further allow recording of well-characterized gratings even if the recording beam wavefronts are not perfectly plane or if they have small local distortions. As the imperfections are scanned along the length of the target, beam imperfections may be reduced dramatically during the scanning and may influence only the contrast of the grating and the width of the fringes.

The embodiments of the invention also provide a system and a method for apodization of large-sized reflection Bragg gratings. One embodiment utilizes two-dimensional scanning of a recording media, i.e., a target, with an interfering pattern from two optical beams having diameters that are comparable in size with the thickness of the Bragg Grating. The method employed in this embodiment provides an opportunity to profile diffraction efficiency (DE) of the gratings across their thicknesses by varying the size and shape of one or both beams. Embodiments of the present invention provide a technique for apodization of reflection Bragg Grating from the side of beam incidence. This allows the apodization of large Bragg Gratings in the direction of propagation of the incident beams.

Apodization of reflection Bragg Grating is accomplished by varying the amplitude of the refractive index in the direction of beam propagation. Usually, the exposure dosage of recording radiation is changed in this direction to provide the required pattern of amplitude modulation. Because the exposure dosage cannot be modulated in the direction of recording, it seems impossible to carry out Bragg Grating apodization from the sides used for recording which are the side where the beams enter the grating. However, the embodiments of the present invention provide scanning techniques for recording of large-sized reflection Bragg Grating that scan the Bragg Gratings partially with interference pattern and partially with homogeneous non-interfered beams. The irradiation pattern resulting from the superimposing the interference pattern with the non-interfered beams yields the desirable apodization as described below.

Figure 7:
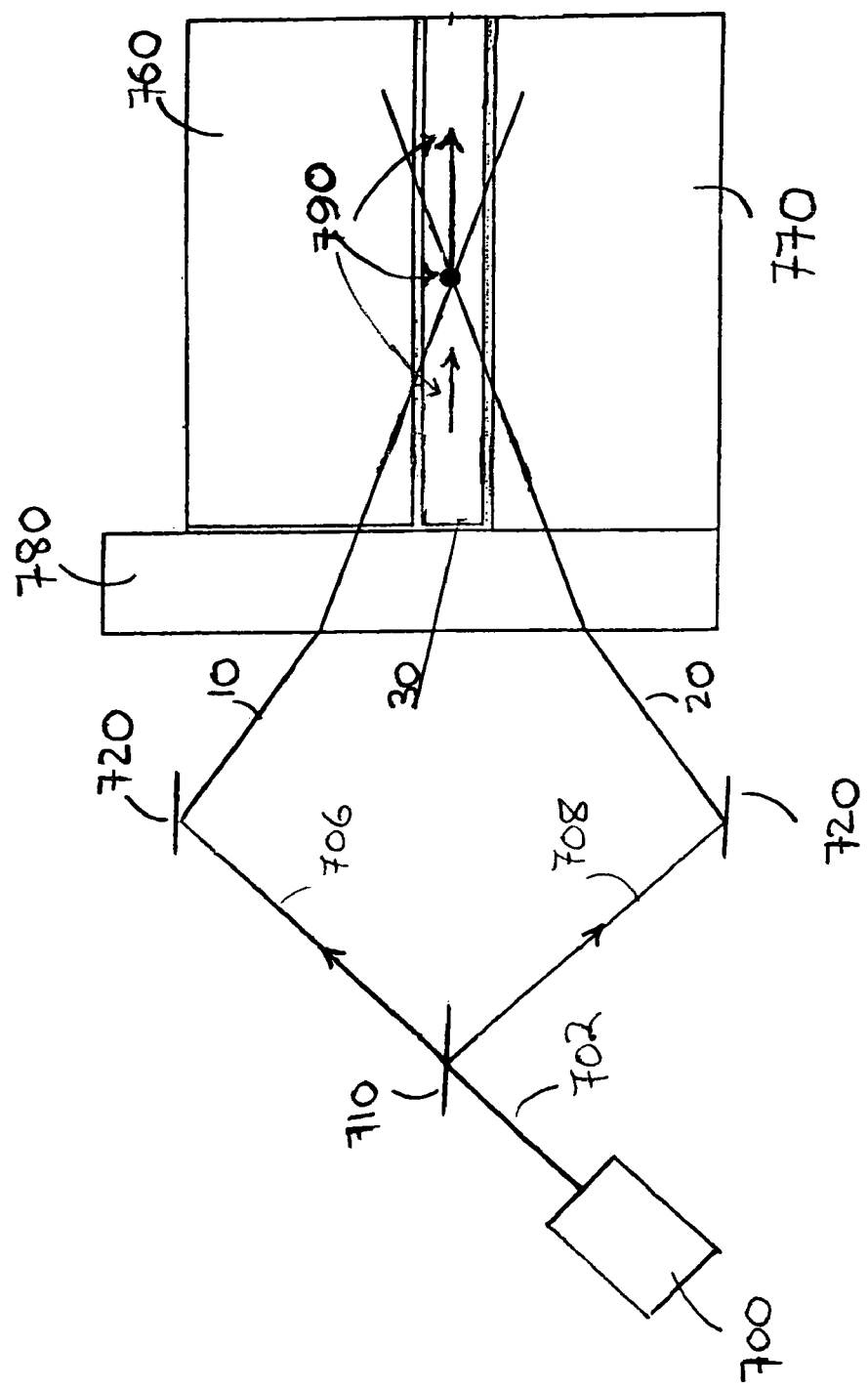
FIG. 7 is a schematic plan view of a further embodiment of a Bragg Grating recording system in reflection geometry according to the invention.

FIG. 7 shows a plan view of one embodiment of a system for recording a Bragg Grating in a photosensitive target 30. The target 30 is surrounded on three of its sides by a first plate 760, a second plate 770, and a third plate 780. As shown in FIG. 7, a beam emitter 700 emits a beam of light which is split into two split beams 10, 20 by a beam splitter 710 and reflected by reflecting elements 720 toward the third plate 780. However, any optical arrangement resulting in two split beams propagating toward the third plate 780 may be used. The beams 10, 20 are transmitted through the third plate 780 and are refracted according to their angles of incidence and the refractive index of the third plate 780. The first beam 10 then proceeds through the first plate 760 and into a side of the target 30. The second beam 20 enters the third plate 780, the second plate 770 which is fixed to the third plate 780 and continues through a second, opposite side of the target 30 to interfere with the first beam in a central region within the target 30. The interference is then recorded in the photosensitive target 30 to create a reflection Bragg Grating. The beams 10, 20 intersect at a point 790 within the target 30. By moving the beams apart the point 790 moves along the target 30 in the directions shown. The above system and method for recording reflection Bragg gratings in reflection geometry are disclosed in the concurrently filed U.S. Patent Application titled "System and Method for Recording Reflection Bragg Gratings," now U.S. Pat. No. 7,406,255, which is incorporated herein by reference.

The method shown in FIG. 7 uses two-dimensional scanning of a target with an interfering pattern from two optical beams which could be relatively small in comparison with a total grating area. A special matching liquid may be used between the plates that are not fixed together. The plates may be made from a high transparent and non-photosensitive material and surround the target that may be a plate of photosensitive material. Attaching the plates to each other with the matching liquid excludes total reflection of the incident beams at the boundaries. The optical scheme of generating both beams from the same source allows synchronous motion of the beams in opposite directions which in turn results in scanning of the point where the beams intersect along the target plate as shown in FIG. 7.

This technique shown in FIG. 7, for scanning the intersection point of the two incident beams along the target, provides a method for apodization of reflection Bragg Grating that reduces the sidelobes of the grating. The scanning of point 790 facilitates a method for apodization of large-sized reflection Bragg Grating.

Figure 8:
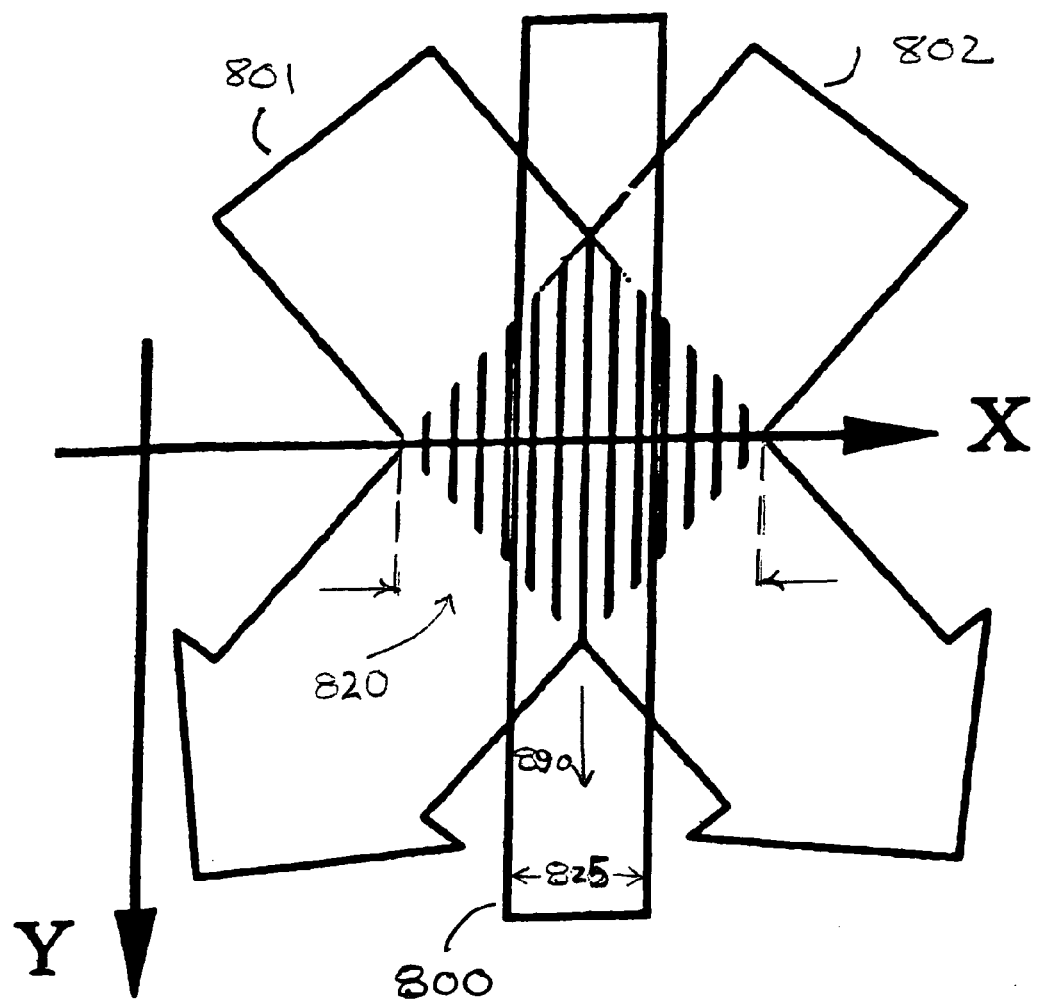
FIG. 8 shows a conventional method for recording a reflection Bragg Grating in reflection geometry.

FIG. 8 shows a conventional method for recording a reflection Bragg Grating in reflection geometry where a thickness of a target medium is smaller than widths of recording beams. Incident beams 801, 802 are used to record a reflection Bragg Grating in a target 800. The target 800 is located along the Y axis. The direction of the X axis is perpendicular to a surface of the target 800 where the beams 801, 802 are incident. The incident beams 801, 802 are Gaussian beams both having a width 820 along the direction X. A thickness 825 of target 800 along the X axis is considerably smaller than the widths 820 of Gaussian beams 801, 802. If the beams 801, 802 are scanned along the direction 890 which is the direction of the Y axis, the target 800 is exposed approximately uniformly across its thickness 825 with the interference pattern generated by the beams. Therefore, the modulation of the amplitude of recorded refractive index across hologram thickness 825 will be approximately the same and even without apodization, a homogeneous hologram is recorded.

Figure 9:
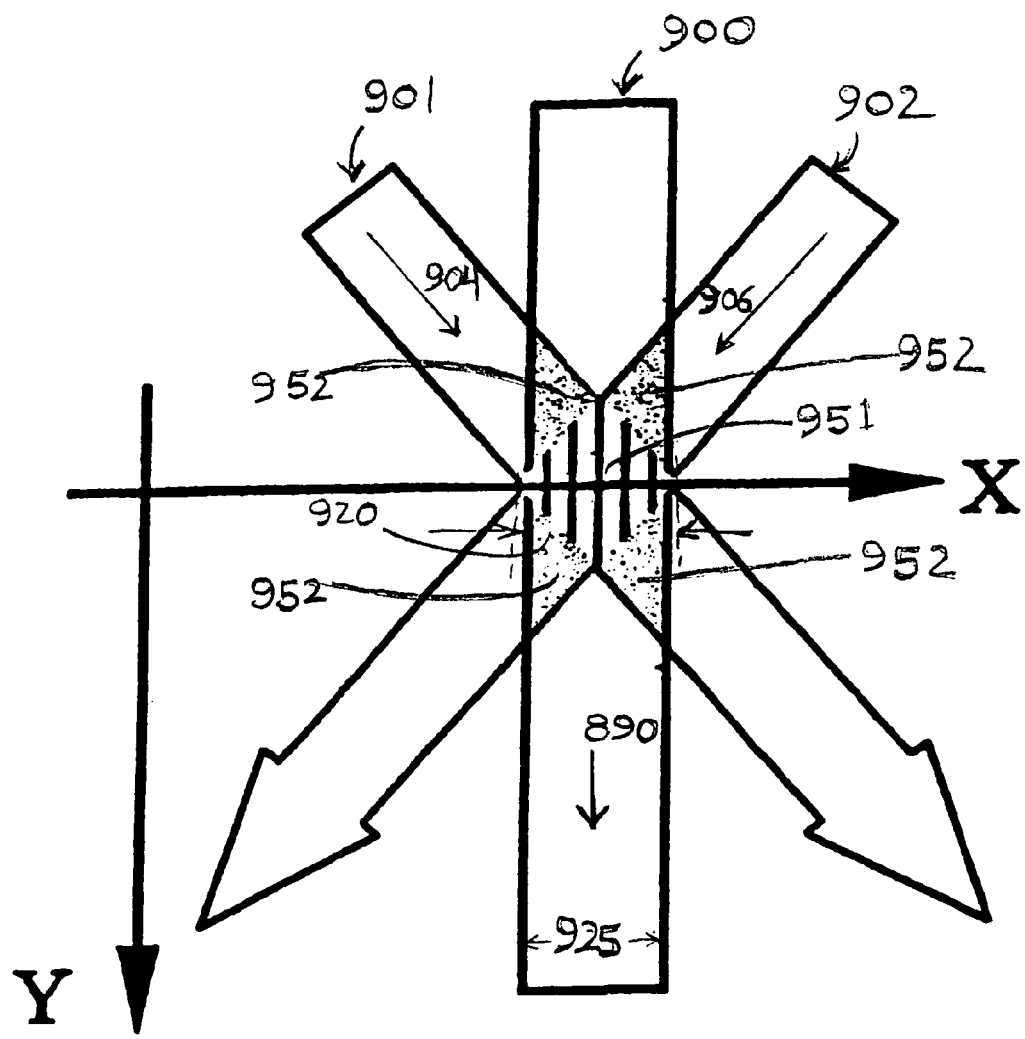
FIG. 9 shows a method for recording a reflection Bragg Grating in reflection geometry according to a further embodiment of the invention.

FIG. 9 shows a method for recording a reflection Bragg Grating in reflection geometry where thickness of the target is comparable with the width of the recording beams. The setup in FIG. 9 is similar to the setup in FIG. 8. Incident beams 901, 902 are used to record a reflection Bragg Grating in a target 900. The target 900 is located along the Y axis. The direction of the X axis is perpendicular to a surface of the target 900 where the beams 901, 902 are incident. The incident beams 901, 902 are Gaussian beams both having a width 920 along the direction X. However, in FIG. 9, the thickness 925 of the target 900 along the X axis is equal to or comparable with the widths 920 of Gaussian beams 901, 902. As a result, if the beams 901, 902 are scanned along the direction 890 which is the direction of the Y axis, the target 900 is exposed very non-uniformly across its thickness 925 with the interference pattern of the two beams. The center of the target 900 will be exposed to the interference pattern 951 throughout the duration of the scanning of the beams along the Y axis direction. On the other hand, edges 952 of the interference pattern 951 will be exposed with radiation from one beam only during most of the scanning period and are exposed to the interference pattern 951 during a short part of the scanning period only. This differential exposure times cause the amplitude of recorded refractive index to vary across the grating thickness 925 approximately from zero at the surfaces of the target 900 where the beams are incident to the maximum at the center of the target.

FIG. 9 shows a method of apodization of the target 900. The first beam 901 is incident on a first side of the target 900 and is transmitted along a first path 904 to a central region 951 in the target 900 such that the target is irradiated sufficiently to induce a change in a refractive index along the first path 904. The second beam 902 is incident upon a second, opposite side of the target 900 and is transmitted along a second path 906 to interfere with the first beam 901 in the central region 951 such that the target 900 is irradiated sufficiently to induce a change in a refractive index along the second path 906. The first beam 901 and the second beam 902 are scanned along the length of the target 900 in the direction of the Y axis such that the central region 951 is scanned along a scan line in the target. In this embodiment, the scan line is parallel to the Y axis in a direction bisecting the angle between the first path 904 and the second path 906. If the thickness of the target is comparable to the sizes of the first and second beams in the direction perpendicular to the surface of the target, as shown in FIG. 9, the target is exposed very non-uniformly across its thickness with the interference pattern during the scanning in direction Y. The center of the medium will thus be exposed with an interference pattern during scanning and may form, for example, a Bragg Grating. The edges of the target, however, will mostly be exposed to non-interfering radiation during scanning with exposure to only the edge corners of the interference pattern. This embodiment provides the variation of amplitude of recorded refractive index modulation across the target approximately from zero at its surfaces to a maximum at its center.

Securing an approximately uniform modification of an average refractive index across the target medium may be particularly efficient if the target does not have a very high absorption coefficient. This is because the distribution of exposure dosage across the medium thickness is defined by the total exposure from both beams 901, 902 which cross every point of the target in the X-Y plane with the same distribution of intensity. This will be described in more detail with references to FIG. 10 and FIG. 11, with the assumption that the target 900 in FIG. 9 has a linear sensitivity and low absorption, and that the beams 901, 902 are flat top beams.

If irradiation of the target 900 by the beams 901, 902 is carried out as discussed in relation to FIG. 9, the target is irradiated with both a rhombic interference pattern and a with pattern not involving interference. For example, in FIG. 9, the central part 951 of the target is receiving the rhombic irradiation and the triangular sides 952 of the target are receiving irradiation without interference.

Figure 10:
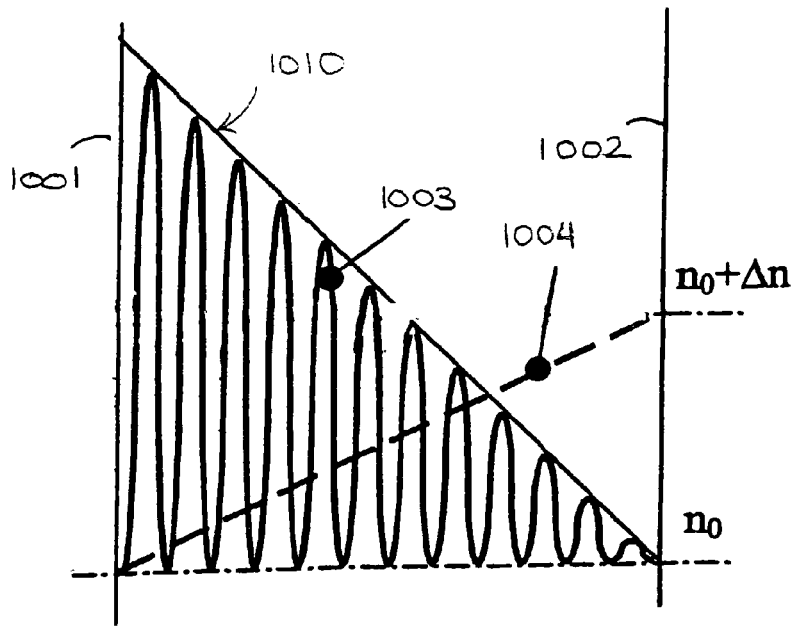
FIG. 10 shows the variation in the refractive index of the target of FIG. 9 after exposure to rhombic interference and to radiation without interference according to the invention.

FIG. 10 shows the variation in the refractive index of the target of FIG. 9 after exposure to rhombic interference and to radiation without interference according to the invention. The total dosage after scanning with the rhombic interference pattern changes linearly from the center 1001 to the surfaces 1002 of the target 900. Therefore, the refractive index varies between the center of the target 1001 and the surfaces 1002 as shown by curve 1003 which is contained by an envelope 1010. The envelope 1010 shows a maximum value of the change in the refractive index due to curve 1003. The baseline value of the refractive index of the target before being irradiated by the beams is shown as $n_0$. According to the envelope 1010, the refractive index changes from $n_0$ to $n_0+2\Delta n$ at the center 1001 and remains unchanged at $n_0$ at the surfaces 1002. On the other hand, the scanning of the target 900 with the portions of the beams 901, 902 that are not interfering 952 results in an additional change in the refractive index that is shown with the straight line 1004. According to the line 1004, the refractive index remains at the baseline value of $n_0$ at the center 1001 and changes to $n_0+\Delta n$ at the surfaces 1002. The surfaces of the target receive the irradiation before it has had opportunity to be absorbed by the photosensitive medium of the target. The maximum change in the refractive index shown by the line 1004 is $\Delta n$ which is half the maximum change $2\Delta n$ shown by envelope 1010. The change in the refractive index shown by the envelope 1010 is larger because the interference of the two beams can influence double the change that may be influenced by one beam alone.

Figure 11:
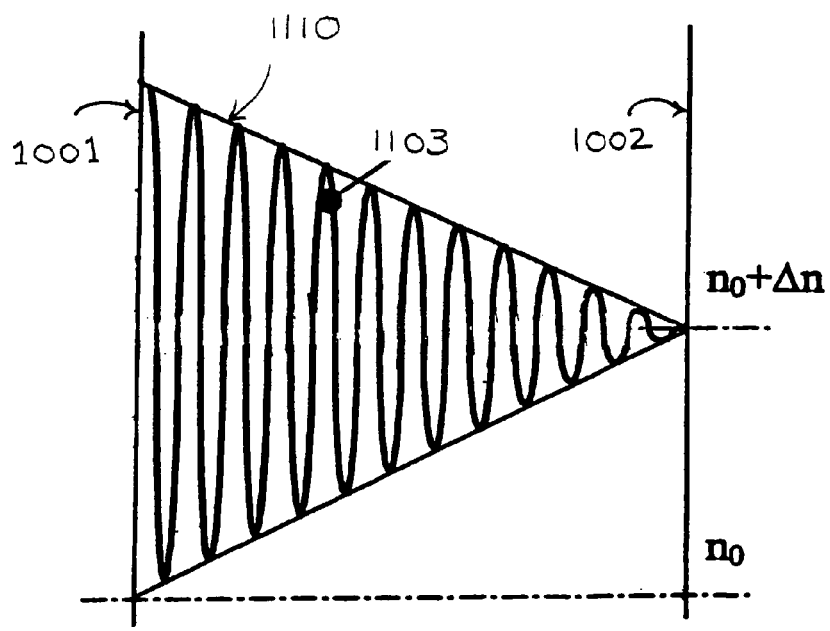
FIG. 11 shows the resultant variation in the refractive index of the target of FIG. 9 after exposure to irradiation with and without interference according to the invention.

FIG. 11 shows the resultant variation in the refractive index of the target of FIG. 9 after exposure to irradiation with and without interference. The resultant change in the refractive index will be defined by both exposures and varies similarly to the curve 1103 in FIG. 11. The resultant change is contained by an envelope 1110. The envelope 1110 goes from $n_0+2\Delta n$ at the center 1001 to $n_0+\Delta n$ at the surfaces 1002. So, the resultant refractive index changes by $\Delta n$ between the center and the surfaces while the change between the same two points of the target due to the rhombic interference alone was $2\Delta n$. Thus, this embodiment allows for apodization and reduction in sidelobes.

FIG. 10 and FIG. 11 show a positive change in the refractive index as a result of the irradiation, that increases the refractive index from $n_0+\Delta n$. However, the change in the refractive index may be negative as well as positive. For example, the exposure of a lithium niobate substrate results in an increase in refractive index while the exposure of a photorefractive glass substrate results in a decrease in refractive index.

Apodization is obtained by securing approximately uniform modification of average refractive index across the Bragg Grating thickness. Refractive index is modified in a substantially uniform manner if the photosensitive medium used as the target does not have a very high absorption coefficient. When the absorption coefficient of the target is high, the incident beams are absorbed at the surface and reach the central parts of the target at lower intensity. When the absorption coefficient of the target is relatively low, the incident beams cross every point of the target in the XY plane with substantially the same intensity. Therefore, the distribution of exposure dosage across the target thickness which is defined by the total exposure from both beams remains relatively uniform. The distribution of average refractive index across a target thickness will not be constant; however, the proposed method allows decreasing the variation of average refractive index due to recording of the hologram.

In one embodiment, the transmitting and scanning are such that an average refractive index of the photosensitive medium 900 is approximately the same along the first side, the second side, and in the central region 951. Referring to FIG. 7, a beam of light 702 is received and split into a first split beam 706 and a second split beam 708. If the target 900 of FIG. 9 is used instead of the photosensitive medium 30 in the system of FIG. 7, the first split beam 706/901 is reflected an odd number of times to be directed along a first split path through a first side of the target 900 to an central region 951 in the target 900 such that a change in a refractive index along the first path 904 is induced. The second split beam 708/902 is reflected an even number of times to be directed along a second path 906 through a second side of the target 900 to interfere with the first split beam 706 in the central region 951 such that a change in a refractive index along the second path 906 is induced. The beam of light is then scanned along the Y-axis direction, as discussed above, such that the central region 951 is scanned along the scan line 890 in the target 900, and an average refractive index of the target 900 is approximately the same along the first side, the second side, and in the central region 951.

Although the present invention has been described with reference to certain exemplary embodiments, it is understood that a variety of modifications and variations may be made to the present invention without departing from the spirit or scope of the invention defined in the appended claims, and their equivalents.

What is claimed is:

1. A method for apodizing a recorded large-sized reflection diffraction grating in a photosensitive stationary target having a first side and a second side opposite the first side, the second side being substantially parallel to the first side, the method comprising:
   splitting a light beam having a substantially planar wavefront using a beam splitter into a first beam and a second beam;
   directing the first beam along a first path incident through the first side of the target while maintaining the substantially planar wavefront to influence a first change in a refractive index of the target along the first path;
   directing the second beam along a second path incident through the second side of the target while maintaining the substantially planar wavefront to influence a second change in the refractive index of the target along the second path, the second beam interfering with the first beam in an interference region in the target; and
   scanning the light beam across the beam splitter to scan the interference region in the stationary target along a scan line bisecting an angle between the first path and the second path at the interference region in the target, the scanning of the light beam progressing such that the portions of the photosensitive stationary target near the first and second sides of the of the target are exposed to more non-interfering radiation and less interfering radiation than at the center of the target,
   wherein a thickness of the target along a first direction substantially perpendicular to each of the first side and the second side is comparable to a width of the first beam along the first direction and a width of the second beam along the first direction.

2. The method of claim 1, wherein an intensity of the first beam, an intensity of the second beam, the angle between the first path and the second path, and the scanning of the interference region are controlled such that an average value of a resulting refractive index of the target is substantially uniform along the first side, the second side, and in a central region of the target.

3. The method of claim 1,
   wherein the first change in the refractive index of the target decreases from a first value at the first side to a second value at a central region of the target,
   wherein the second change in the refractive index of the target decreases from a third value at the second side to a fourth value at the central region of the target,
   wherein a third change in the refractive index of the target in the interference region follows an oscillating pattern bounded by an envelope decreasing from a fifth value at the central region to the first value at the first side and the third value at the second side, and
   wherein a resulting refractive index of the target is equal to a previous refractive index of the target plus a sum of the first change, the second change, and the third change.

4. The method of claim 3,
   wherein the first value and the third value are substantially equal, wherein the second value and the fourth value are substantially equal,
wherein the fifth value is substantially twice the second value, and
wherein an average of the resulting refractive index of the target is substantially uniform along the thickness of the target from the first side to the central region to the second side.

5. The method of claim 1, further comprising recording interference of the first beam and the second beam in the target to form a Bragg Grating.

6. The method of claim 1, wherein the first beam and the second beam are Gaussian beams.

* * * * *